(12) United States Patent
Hillebrand et al.

(10) Patent No.: US 9,841,954 B1
(45) Date of Patent: Dec. 12, 2017

(54) METHOD AND SYSTEM FOR AUTOMATIC CODE GENERATION

(71) Applicant: dSPACE digital signal processing and control engineering GmbH, Paderborn (DE)

(72) Inventors: Sebastian Hillebrand, Marsberg (DE); Uwe Seidler, Paderborn (DE)

(73) Assignee: dSPACE digital signal processing and control engineering GmbH, Paderborn (DE)

( * ) Notice: Subject to any disclaimer, the term of this patent is extended or adjusted under 35 U.S.C. 154(b) by 0 days.

(21) Appl. No.: 15/233,347

(22) Filed: Aug. 10, 2016

(51) Int. Cl.
*G06F 9/44* (2006.01)
*G06F 17/50* (2006.01)
*G06F 9/45* (2006.01)

(52) U.S. Cl.
CPC ..................................... *G06F 8/35* (2013.01)

(58) Field of Classification Search
CPC .......... G06F 8/34; G06F 8/35; G06F 11/2294; G06F 11/2733; G06F 17/5054; G06F 17/5009
See application file for complete search history.

(56) References Cited

U.S. PATENT DOCUMENTS

| | | | | |
|---|---|---|---|---|
| 7,167,817 B2* | 1/2007 | Mosterman | ............... | G06F 8/34 703/2 |
| 7,809,545 B2* | 10/2010 | Ciolfi | ...................... | G06F 8/34 703/22 |
| 7,823,122 B1* | 10/2010 | Englehart | ................. | G06F 8/35 715/762 |
| 8,126,691 B2* | 2/2012 | Ciolfi | .................. | G06F 17/5009 703/13 |
| 8,667,407 B1* | 3/2014 | Szpak | ...................... | G06F 8/10 715/762 |
| 2005/0229139 A1* | 10/2005 | Tsai | ..................... | G06F 17/5054 716/104 |
| 2015/0331974 A1* | 11/2015 | Subbarayan | ........ | G06F 17/5009 703/2 |

OTHER PUBLICATIONS

Han et al., A graph algorithm for linearizing simulink models, Jun. 2013, 8 pages.*
N. Kapre, Optimizing Soft Vector Processing in FPGA-Based Embedded Systems, Sep. 2016, 17 pages.*
H. Hanselmann et al., "Production Quality Code Generation from Simulink Block Diagrams", Proceedings of the 1999 IEEE International Symposium on Computer Aided Control System Design, pp. 213-218, Kohala-Coast, Hawai'i, USA (Aug. 22-27, 1999).

* cited by examiner

*Primary Examiner* — Thuy Dao
(74) *Attorney, Agent, or Firm* — Muncy, Geissler, Olds & Lowe, P.C.

(57) ABSTRACT

A method for generating production code from a block diagram in a technical computing environment on a host computer. A first block receives a first input signal that has a plurality of elements. A size of a first required signal of the external function is determined and compared to a size of the first input signal. When the size of the first required signal corresponds to the size of an element in the first input signal a production code is generated enclosing a call of the external function by a loop consecutively addressing each of the plurality of elements in the first input signal. When the size of the first required signal corresponds to the size of the first input signal a production code is generated having a call of the external function without enclosing loop over the elements in the first input signal.

17 Claims, 5 Drawing Sheets

```
In[5], Out[5];                    In[5], Out[5];
For (i=1..5)                      {
{                                  customLUT(Out,In,5);
 Out[i]=customLUT(In[i])          }
}
```

Fig. 9a                           Fig. 9b

METHOD AND SYSTEM FOR AUTOMATIC CODE GENERATION

BACKGROUND OF THE INVENTION

Field of the Invention

The present invention relates to methods and computer systems for automatically generating code from block diagrams, the code preferably being used in electronic control units.

Description of the Background Art

Electronic control units (ECUs) are ubiquitous especially in automotive applications. Generally, they may contain a processor, in particular a microcontroller, one or more sensor interfaces and one or more circuits to control an actuator or sensor. Current parameters of a physical process are preferably determined using the signals of the one or more sensors connected to the sensor interfaces. Based on a predefined control strategy, the processor may control the one or more circuits to apply the actuators in order to influence the physical process. In a particular example, an ECU may be used to perform anti-lock braking, with a sensor measuring the wheel velocity and a magnetic valve reducing the pressure in the corresponding wheel brakes.

In order to speed up the development process for ECUs, control strategies are preferably developed using block diagrams in a technical computing environment (abbreviated as TCE), which allows for tracing the temporal behavior of a physical system described by one or more blocks in the block diagram. One particular example of a TCE is MATLAB/Simulink of The MathWorks.

The document "Production Quality Code Generation from Simulink Block Diagrams", Proceedings of the 1999 IEEE International Symposium on Computer Aided Control System Design, Kohala-Coast, Hawai'i, USA, by H. Hanselmann et al. describes a system for automatically generating production code based on a block diagram containing one or more blocks that specify the functionality of the program. The program may in particular be a control program for an ECU, the control program implementing the desired control strategy.

Control strategies may be implemented in an ECU via a lookup-table that produces an output signal as a function of an input signal. This is particularly useful when functions are computationally expensive. Because the lookup-table may need to be evaluated multiple times during a cycle of the control program, an efficient implementation of the lookup-table functionality is important. This can e.g. be provided by a custom lookup-table functionality provided by invoking an external function that may in particular contain highly optimized, hand-written code.

To facilitate the use of external functions, an automatic adaptation of the generated production code to the specific custom lookup-table functionality is desirable.

SUMMARY OF THE INVENTION

It is therefore an object of the present invention to provide a method and computer system for automatically generating production code from block diagrams.

In an exemplary embodiment of the invention, computer-implemented methods for generating production code from a block diagram in a technical computing environment on a host computer are provided. A block in the block diagram may comprise a number of input ports for receiving signals and a number of output ports for sending signals. A first block in the block diagram provides a functionality that is being implemented in the production code by invoking an external function, and the first block receives a first input signal that is composed of a plurality of elements. The methods comprise: determining a size of a first required signal of the external function; comparing a size of the first input signal to the size of the first required signal; and when the size of the first required signal corresponds to the size of an element in the first input signal: Generating a production code enclosing a call of the external function by a loop consecutively addressing each of the plurality of elements in the first input signal or when the size of the first required signal corresponds to the size of the first input signal: generating a production code comprising a call of the external function without enclosing loop over the elements in the first input signal.

The inventive method allows for an easy reuse of available external functions providing a functionality, in particular a lookup table functionality. The production code generated from a block diagram is automatically adapted to the specific interface of the external function. Therefore, the design of a new control program is accelerated.

While the inventive method is described below in connection with a lookup table functionality, it is also applicable to other blocks who provide a functionality that is implemented in the production code by invoking an external function. Examples for such a block comprise, for example, filter blocks, in particular a FIR filter, or blocks implementing computationally expensive mathematical calculations. Generally, the inventive method is also applicable for block diagrams specifying internal states of a system, in particular state charts.

When the external function accepts arguments in size ranges, e.g. the function accepts a vector (or a pointer to a vector) as input, and the number of elements can be specified, the production code generator may be adapted to add a further argument indicating the number of elements present in the input signal.

The steps of the inventive methods may preferably be carried out by a processor running different software components on the host computer, the software components preferably using the mechanisms of the technical computing environment or of the operating system of the host computer to exchange data and/or cause the execution of one or more further software components. For example, the technical computing environment may comprise and/or be interfaced to a code generator that converts one or more blocks of the block diagram to production code. When the conversion is finished, the code generator may invoke a production code compiler in order to compile the production code to an executable. The processor of the host computer may be a general-purpose microprocessor with high computational speed and no strict limitation on the thermal power produced during the computation.

The host computer may be realized as, for example, a single standard computer comprising a processor, a display device and an input device. Alternatively, the host computer may comprise one or more servers comprising one or more processing elements, the servers being connected to a client comprising a display device and an input device via a network. Therefore, the technical computing environment may be executed partially or completely on a remote server, such as in a cloud computing setup. A graphical user interface of the technical computing environment may be displayed on a portable computing device, in particular a computing device with a touch screen interface. In this case, it is particularly advantageous when the computations for executing the block diagram are carried out on a remote server.

The technical computing environment may comprise a graphical user interface for modifying the block diagram and a simulation engine for executing the block diagram, so that the dynamical system described by the block diagram can be simulated. The block diagram may comprise multiple blocks with input and/or output signals that are connected to output and/or input signals of other blocks. Each block may be an atomic functional unit or may be composed of a plurality of subordinate blocks. Preferably, one or more blocks of the block diagram model the desired behavior or intended functionality of the control program. Other blocks may for instance represent test input stimuli for the modeled control program or a plant model connected to the modeled control program to form a model of the complete dynamic system and to provide a closed control loop. Blocks may be connected via signals in order to exchange data; a bus containing a plurality of binary signals is a particular example of a composite signal. When an input port of a first block and an output port of a second block are connected via a signal, the second block is upstream of the first block. Signals may, but need not be visible in the modeling environment; alternatively, two blocks may be linked implicitly by indicating a connection via indicators specifying one or more connected blocks. Information concerning signals or blocks may be stored in a data management tool, so that production code may be generated based on the contents of the data management tool.

The production code may be adapted to a specific processor, e.g. a particular microprocessor or a programmable logic element, a specific set of language operations, e.g. compliant to a predefined restricted language standard, and/or may be an optimized code, so that e.g. the number of processing operations may be minimized and/or limited to a certain threshold and/or maximum execution time. In an embodiment of the invention, an additional user interface may be provided for selecting the scope and/or extent and/or criteria for optimization of the generated production code.

A one-dimensional lookup table receives one input signal and based on a characteristic curve determines one output signal. The output signal may e.g. be of a scalar type such as double. A table comprising multiple nodes, i.e. pairs of input values and corresponding output values, may in particular represent the characteristic curve. When the input values in the table are equidistant, the code generator may add code for generating the input values on the fly and only the individual output signals may be stored in the production code. In order to determine a size of the first input signal, the production code may comprise instruction for counting the number of elementary signals comprised in the first input signal. According to an embodiment of the invention, the first block may receive an additional signal input for table data, so that the processor executing the production code may add or modify one or more nodes of the characteristic curve during runtime. In an embodiment, the block diagram can comprise more than one characteristic curve statically assigned to the first block, and the first block receives an additional input signal for choosing an active characteristic curve, so that the output signal is determined from the currently active characteristic curve.

The first input signal may in particular be a vector comprising M elements of a scalar type. When the required input signal is of a scalar type, the code generator creates a production code in which the code for calling the external function is inside of an indexed loop consecutively addressing each of the M elements in the first input signal. The stop value for the indexed loop is determined based on M. Depending on the start value of the indexed loop, the stop value may in particular be M or M−1.

N-dimensional lookup tables receives N input signals and determine one output signal based on a characteristic surface. When generating production code from a first block comprising an N-dimensional lookup table, the code generator may create instructions for N nested loops.

The external function can be realized as a library function that is linked statically or dynamically to the executable after the code generator has converted the block diagram to production code generated from the block diagram. The external function needs only be compiled once, and a new control program is created faster.

According to an exemplary embodiment of the invention, when the first block receives a second input signal that is composed by a number of elements, the method further comprises: determining a size of a second required signal of the external function; comparing a size of the second input signal to the size of the first required signal; and when the size of the second required signal corresponds to the size of an element in the first input signal: Generating a production code enclosing a call of the external function by a loop consecutively addressing each of the plurality of elements in the second input signal or when the size of the second required signal corresponds to the size of the second input signal: generating a production code comprising a call of the external function without enclosing loop over the elements in the second input signal.

For a lookup table comprising input ports for receiving more than one signal, the generated code may comprise a loop consecutively addressing each of the plurality of elements for each of the respective signals.

For a host computer comprising more than one processor core in one or more processors, generating the production code can comprise generating instructions for distributing the execution of a loop addressing the plurality of elements over the available processor cores. Thus, when the host computer comprises a plurality of processor cores, the generated code may comprise instructions for distributing the single iterations of the loop over all available processor cores. As an alternative to general-purpose processors, the production code may address the plurality of processing elements of a GPU as processor cores for the calculations. Spreading out an indexed loop over a number of processor cores allows for considerably reducing the execution time.

According to an embodiment of the invention, determining a size of the required input signal of the external function comprises retrieving a template of the external function, preferably from a script in a language adapted to the technical computing environment or from a header file.

In an embodiment of the invention, determining a size of the required input signal comprises determining an elementary data type of the required input signal, wherein the elementary data type is compared to a data type of an element in the first input signal, and wherein an error is signaled when the elementary data type of the required input signal is not compatible to the data type of the elements in the first input signal. Compatible may, but need not, mean the same data type. Generally, any elementary data type who encompasses the full range of possible values in the data type of the elements of the first input signal may be considered compatible.

In an embodiment of the invention, comparing the size of the first input signal to the size of the required input signal comprises verifying that the elementary data type of the required input signal is equal to the data type of the elements in the first input signal.

In an embodiment of the invention, when the size of the first input signal is one and the size of the required input signal is bigger than one, the code generator can add instructions for assigning the current value of the first input signal to each of the elements of the required input signal. Thus, when the first input signal is a scalar and the required input signal is a vector, the first input signal may be expanded to a vector by duplicating the first input signal. This simplifies the design of a new block diagram.

A plurality of external functions providing the functionality or similar functionalities may be registered in the technical computing environment, each external function being registered with a template defining the size and an elementary data type of the required input signal, for example, also defining a size and an elementary data type of a resulting output signal; the external function to be invoked is determined based on a comparison of the size of the required input signal for the respective external function and the size of the first input signal and/or a comparison of the elementary data type of the required input signal for the respective external function and the data type of the elements in the first input signal and/or based on a default setting in a user interface. Advantageously, the external function to be invoked can be determined automatically. Depending on a default strategy chosen in a graphical user interface, a lookup table functionality with a vector as required input signal may be preferred over a lookup table functionality with a scalar as required input signal combined with an automatically added loop over the elements in the vector.

The first input signal may be of a vector type, i.e. the size of the first input signal is an integer bigger than one, or of a matrix type, i.e. the size of the first input signal is an integer bigger than one times an integer bigger than one, and the elements of the first input signals may be of a scalar type. Scalar types comprise integers, fixed-point numbers and floating-point numbers.

The dimension of the first input signal may be higher than the dimension of a vector, so that the first input signal is composed of a plurality of independent vectors, such as a matrix type, and the elements of the first input signal may be of a vector type. When the required input signal is of a scalar type, generating a production code comprises placing the call of the external function in an inner loop consecutively addressing each of the plurality of elements in the elements of the first input signal.

According to an embodiment of the invention, the functionality of the first block is a lookup table functionality that comprises storing an index value of a previous invocation of the lookup table functionality in a state variable. For slowly varying input signals, the search for the output value is accelerated considerably.

According to an embodiment of the invention, the state variable comprises a number of elementary variables, and the number of elementary variables comprised in the state variable depends on the size of the first input signal.

According to an embodiment of the invention, the state variable can include a single elementary variable, and the lookup table functionality uses the single elementary variable as state variable for all elements of the first input signal. When the elements in the first input signal are somehow correlated, storing a previous state in a single elementary variable may provide for a considerable speed-up of successive lookups while using a negligible amount of memory. The elementary variables may in particular be of a scalar type.

According to an embodiment of the invention, the technical computing environment can comprise a user interface for switching between a state variable comprising a number of elementary variables and a state variable having a single elementary variable.

One aspect of the invention also concerns a non-transitory computer readable medium containing instructions that, when executed by a microprocessor of a computer system, cause the computer system to carry out an inventive method as described above or in the appended claims.

In a further aspect of the invention, a computer system is provided which comprises a processor, a random access memory, a graphics controller connected to a display, a serial interface connected to at least one human input device, and a nonvolatile memory, in particular a hard disk or a solid-state disk. The nonvolatile memory comprises instructions that, when executed by the processor, cause the computer system to carry out an inventive method.

The processor may be a general-purpose microprocessor that is customary used as the central processing unit of a personal computer or it may comprise one or a plurality of processing elements adapted for carrying out specific calculations, such as a graphics-processing unit. In alternative embodiments of the invention, the processor may be replaced or complemented by a programmable logic device, such as a field-programmable gate array, which is configured to provide a defined set of operations and/or may comprise an IP core microprocessor.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 9a is an example of production code when the dimension of the required signal corresponds to that of an element in the input signal;

FIG. 9b is an example of combined production code when the dimension of the required signal corresponds to that of the input signal.

DETAILED DESCRIPTION

Figure 1:
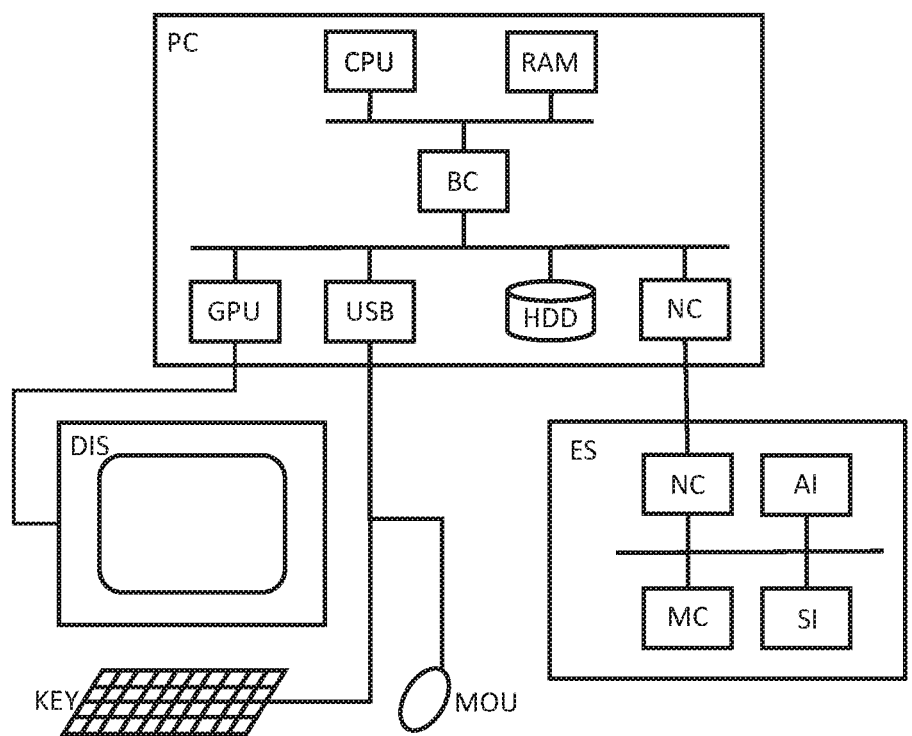
FIG. 1 is an exemplary diagram of a computer system.

FIG. 1 illustrates an exemplary embodiment of a computer system.

The shown embodiment comprises a host computer PC with a display DIS and human interface devices such as a keyboard KEY and a mouse MOU; further, an embedded system ES is depicted, which may e.g. be used for a processor-in-the-loop simulation.

The host computer PC comprises at least one processor CPU with one or multiple cores, a random access memory RAM and a number of devices connected to a local bus (such as PCI Express), which exchanges data with the CPU via a bus controller BC. The devices comprise e.g. a graphics-processing unit GPU for driving the display, a controller USB for attaching peripherals, a non-volatile memory HDD such as a hard disk or a solid-state disk, and a network interface NC. Preferably, the non-volatile memory comprises instructions that, when executed by one or more cores of the processor CPU, cause the computer system to carry out a method according to one of the claims.

The embedded system ES comprises a network interface NC, an actuator interface AI and a sensor interface SI as well as a microcontroller MC. As an alternative or addition to the microcontroller MC, the embedded system ES may comprise a programmable logic device such as a field-programmable gate array. The programmable logic device may contain a hardwired digital signal processor and it may be configured to comprise an IP core microprocessor. Preferably, the embedded system ES is connected to the personal computer PC via the network interface NC, which may e.g. be of USB, RS-232 or Ethernet type. The embedded system may comprise a non-volatile memory that comprises instructions to be carried out by the microcontroller or a configuration to be loaded on the programmable logic device.

In alternative embodiments of the invention, the host computer may comprise one or more servers comprising one or more processing elements, the servers being connected to a client comprising a display device and an input device via a network. Thus, the technical computing environment may be executed partially or completely on a remote server, such as in a cloud computing setup. A personal computer may be used as a client comprising a display device and an input device via a network. Alternatively, a graphical user interface of the technical computing environment may be displayed on a portable computing device, in particular a portable computing device with a touch screen interface or a virtual reality device.

In embodiments of the invention, the computer system does not comprise an embedded system ES. While the embedded system ES is useful for carrying out a processor-in-the-loop simulation of a control program, the presence of an embedded system may not be necessary for carrying out the present invention.

Figure 2:
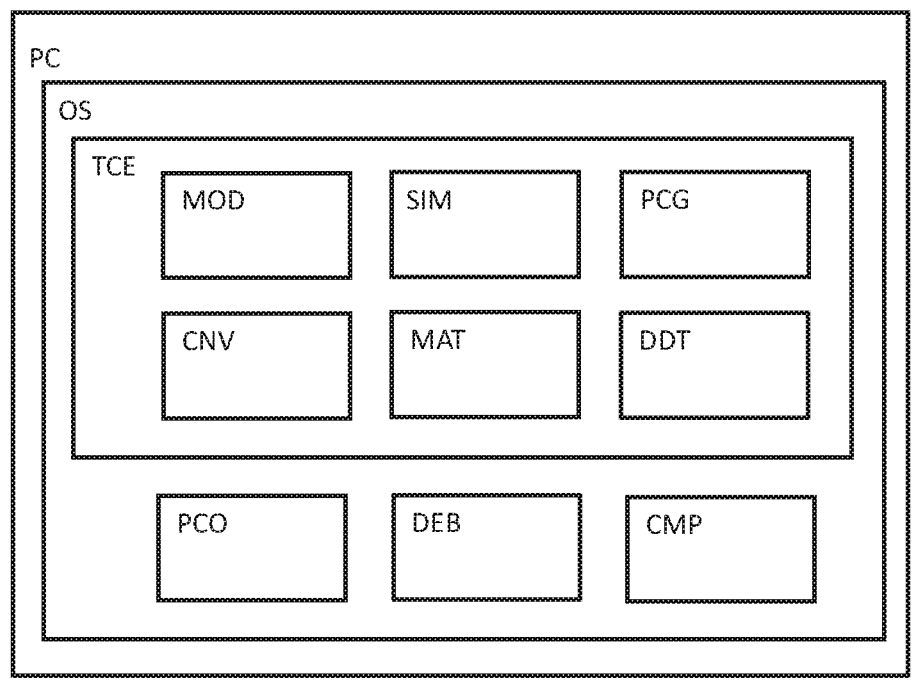
FIG. 2 is an exemplary diagram of software components in a computer system.

FIG. 2 displays an exemplary embodiment of the software components being executed on a computer system, which may be realized as a host computer PC with a standard microprocessor that runs a standard operating system OS such as Microsoft Windows or a Linux distribution.

On the host computer PC, a technical computing environment TCE such as MATLAB/Simulink of The Mathworks may be installed. Other examples of technical computing environments comprise Labview of National Instruments or ASCET of ETAS. The technical computing environment TCE comprises a plurality of software components such as a modelling environment MOD, a simulation engine SIM and a converter CNV. Additionally, the TCE may comprise a mathematical and/or script interpreter MAT that is adapted for carrying out calculations or modifying data. The TCE comprises a production code generator PCG that is adapted to produce production code from a model; further, it may comprise a data definition tool DDT that separately stores additional data for the code generation. The additional data may e.g. comprise global or shared variables of the ECU and/or definitions of data types. The expression that a software component is comprised in the TCE is intended to encompass the case that the software component uses a specific mechanism of the TCE such as an application-programming interface of the TCE in order to exchange data and/or instructions with other software components in the TCE. For example, a software component may be realized as or comprise an add-on such as a toolbox for the modelling environment.

The modelling environment MOD may provide a graphical user interface for creating and modifying block diagrams that preferably describe the temporal behavior of a dynamic system. Additionally, blocks adapted for describing finite states and conditions for transitions between states may be used to model the dynamic system. A block may describe an atomic operation, such as an arithmetic calculation or a logic expression, or it may represent a subsystem that is described in more detail by an additional block diagram in a subordinate hierarchical level. Alternatively, it may contain code in a higher-level programming language, in particular a dynamic language intended for mathematical programming, that realizes the block's functionality. Multiple blocks may be connected by signals for the exchange of data. For example, an initial block may receive a signal of type single as input signal, may modify the signal e.g. by adding a constant and may send an output signal of type double to a further block. It may be said that the further block is downstream of the initial block because they are connected by a signal path so that data flows from the initial block to the further block.

The simulation engine SIM may be adapted to execute a block diagram created in the modelling environment MOD in order to observe the temporal behavior of the dynamic system described by the block diagram. The execution of a block diagram may also be called a model-in-the-loop simulation of the dynamic system and is preferably carried out using high-precision operations in order to observe the behavior more closely and to create reference data.

A converter CNV may be invoked to convert the block diagram to a form that can be simulated more quickly. The form may for instance be simulation code such as plain C-Code containing high-precision operations. Thus, the converter CNV may e.g. comprise a code generator for generating simulation code and a simulation code compiler. In order to speed up the conversion process, code generator and/or compiler may not apply any optimizations or limit the extent of applied optimizations. The use of a converter allows for simulations in an accelerated mode, so that the time for carrying out the calculations in a simulated time step is reduced. The simulation code compiler is preferably adapted for enhanced compatibility with the simulation engine of the TCE. In the case of Matlab/Simulink, the simulation code compiler may e.g. be used to compile a communication function, in particular an S-function.

The production code generator PCG allows for creating production code from one or more blocks in a block diagram. Production code may be optimized for readability, traceability, safety, low-energy consumption, execution speed and/or memory requirements. Preferably, the code generator provides a user interface for setting a plurality of options for adapting the customization of the generated code. Customization options may include target-specific optimizations for the microcontroller of the embedded system and enforcing compliance of the generated code to a specific standard, such as the MISRA C guidelines. A particularly preferred production code generator PCG is TargetLink of dSPACE.

The data definition tool DDT provides a database for storing definitions and parameters as well as an application-programming interface for automatic exchange of the data between different software components. This allows for a clean separation of the model of the dynamic system given in the block diagram from implementation-specific details stored in the database. When a complex model is structured in different sub-models, data in different sub-models may be linked. By storing corresponding information in the data definition tool, these dependencies may be automatically resolved. Additionally, by exchanging data with a software architecture tool, such as SystemDesk of dSPACE, the data definition tool DDT can be used as part of a higher-level tool chain, in particular to generate product code compliant to the AUTOSAR standard. A preferred data definition tool is TargetLink Data Dictionary of dSPACE.

Other software components such as a production code compiler PCO, a debugger DEB or a comparison tool CMP may also be installed on the computer. These software components may be interfaced to each other and/or the technical computing environment using standard mechanisms of the underlying operating system OS. The compiler COM may generate an executable for the microprocessor of the PC or it may generate an object code for the microcontroller of the embedded system. Additionally, it may be configured to generate additional debugging information and to include it in the executable. In this way, the debugger DEB can e.g. be used for observing the value of a signal during a software-in-the-loop simulation of the generated production code. Depending on the intended use, the observed values may be directly displayed to the user and/or they may be logged in a memory, e.g. in RAM, in a file or a database.

Figure 3:
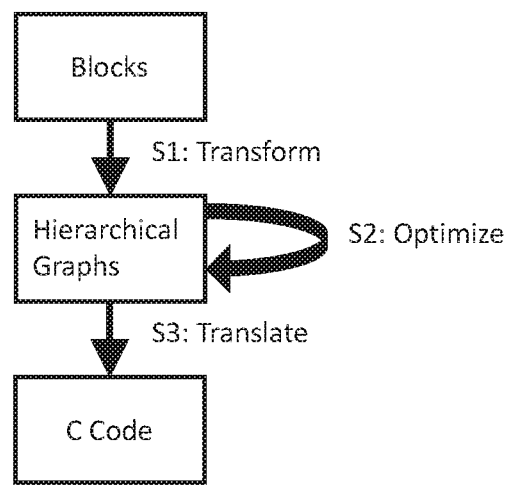
FIG. 3 is an exemplary diagram of a method for generating production code from a block diagram.

FIG. 3 illustrates an exemplary embodiment of the generation of production code from one more blocks in a block diagram. The following steps are preferably carried out by a microprocessor on the host computer; alternatively, a client server setup may be used so that computationally expensive steps are carried on a remote server containing a plurality of microprocessors.

In a first step S1, the selected one or more blocks (or, if selected, the entire block diagram) and related input data are transformed to an intermediate representation such as one or more hierarchical graphs. These hierarchical graphs may in particular comprise a data flow graph, a control flow graph and/or a tree structure. Related input data may e.g. be extracted from a database associated with the block diagram. This may encompass situations where elements of the block diagram are created based on information from a data definition tool, or where settings relevant for the production code generation are retrieved from the data definition tool.

In a second step S2, the hierarchical graphs are optimized in order to reduce the number of variables required and/or the number of operations or instructions to be carried out. This optimization may comprise a plurality of intermediate steps on further intermediate representations between block level and production code level. In each step, an initial set of hierarchical graphs or an intermediate language is converted to a modified set of hierarchical graphs or an intermediate language while applying one or more optimization rules. A number of strategies such as constant folding or elimination of dead code may be applied during optimization.

In a third step S3, the optimized intermediate representations such as optimized hierarchical graphs are translated to code in a high-level or low-level programming language, preferably C code. The code may be further optimized in this step and restricted to a subset of the linear or parallel programming language, the control and dataflow structures may be restricted to precisely specified variants, the scope of functions and data may be restricted according to accurately specified rules. Alternatively or in addition, additional information may be added to the code, e.g. in the form of comments, to enhance readability or help in debugging the code.

During or after the code generation, information on the current block diagram or the code generation, especially results of the code generation, may again be stored in a database such as the data definition tool. This information may e.g. be used to initialize the simulation engine, to influence a compilation process with a production code compiler, or to export production code information for use in other tools/process, like e.g. calibration and measurement information in ASAP2 format or AUTOSAR XML information.

In exemplary embodiments, hardware-level code or a configuration for a programmable hardware device may be created from the blocks describing the control program.

Figure 4:
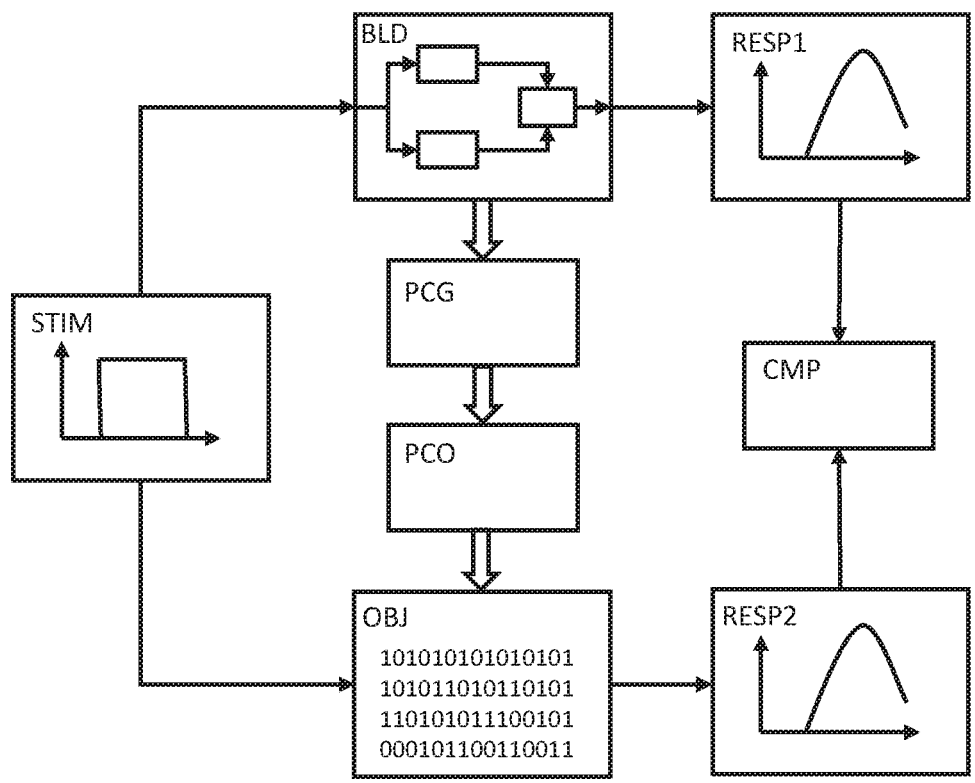
FIG. 4 is an exemplary diagram of a method for testing the compliance of the executable with a model specifying the desired behavior.

FIG. 4 displays an exemplary embodiment of a method for compiling and testing a control program.

The modelling environment MOD of the TCE preferably comprises a graphical user interface for modifying a block diagram BLD, which may comprise a plurality of blocks interconnected by signal paths. Each block may be an atomic block providing a specific functionality or it may represent a subsystem or a submodel, which may comprise a plurality of subordinate blocks that are shown in a lower hierarchical level. Blocks may be connected by signals which may be of scalar or composite type and which can be represented by arrows indication the direction of the data flow. In the shown example, the block diagram comprises three blocks, an input port for receiving an input signal and an output port for sending an output signal. Preferably, the block diagram describes the predetermined or intended behavior of a control program. Upon activation of the simulation engine in the technical computing environment, the block diagram BLD is executed and results are calculated for each time step. The block diagram may be interpreted directly or it may be converted to an intermediate form that allows for a faster execution in the simulation engine.

For example, a number of test cases for the control program have been deduced from the specification and intended application of the control program. Advantageously, a test case comprises a stimulus STIM sent as an input signal to the control program and a corresponding response RESP received as an output signal from the control program. In the shown example, the stimulus STIM is represented by a diagram depicted a particular temporal behavior of the input signal. When the control program is executed in the simulation engine on the host computer, operations corresponding to the block diagram BLD are carried out for a plurality of time steps. During each time step, the current value of the stimulus STIM is fed to the appropriate input ports of the block diagram, the block diagram BLD is being executed in the simulation engine, so that signals are being manipulated and a new internal state of the model may be reached. By simulating the model given in the block diagram for a predetermined duration and by recording the output signal, a response RESP1 can be determined in a model-in-the-loop simulation. A model-in-the-loop simulation mode may be used for verifying that the block diagram executed in the simulation engine actually describes the intended behavior of the control program. All arithmetic calculations can be carried out with high-precision operations, e.g. using the floating-point data type double for the variables. As a result, the simulation is sufficiently accurate to use the recorded output signals as reference data.

Once correctness of the model has been established and reference data has been stored, the blocks corresponding to the control program are converted to program code via the production code generator PCG. The generated production code is then compiled to object code or an executable using the production code compiler PCO; an object code is binary data that contains instructions for a particular processor. When the object code is combined with additional information for the operating system of the host computer, an executable for the host computer is formed. Settings applied during the code generation may comprise a conversion to lower-precision operations that are computationally more efficient, e.g. integer instructions for fixed-point calculations, so that the control program later can be executed in real-time on the microcontroller of an embedded system.

In order to verify that the calculations of the generated code are sufficiently accurate and match the behavior of the blocks in the graphical model, a software-in-the-loop simulation or a processor-in-the-loop simulation may be carried out. The object code or the executable OBJ, which may be in the form of a DLL, contains calculations corresponding to the block diagram. During a predetermined duration, a stimulus STIM is fed to the object code or executable OBJ, and the output signals are recorded to obtain a response RESP2.

The response RESP1 of the model-in-the-loop simulation may be displayed on the host computer simultaneously with the response RESP2 of the generated code, so that a visual comparison may be performed by the user. Additionally or alternatively, the response RESP1 and RESP2 may be compared in a comparison tool CMP, so that a number of checks for compliance to predetermined conditions may be carried out. Preferably, the output signals are compared point by point; in particular, the absolute difference between a data point in RESP1 and the corresponding data point in RESP2 may be calculated. By comparing the differences to a threshold indicating a maximum permissible difference, the correctness of the optimizations applied when generating and compiling the code can be verified.

Figure 5:
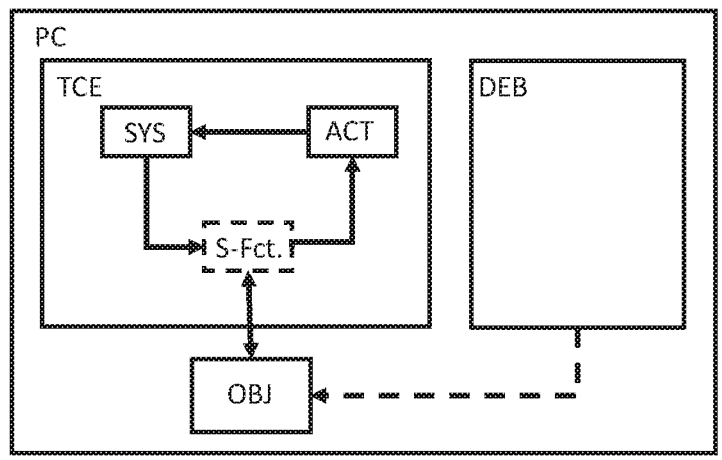
FIG. 5 is an exemplary diagram of a software-in-the-loop simulation.

FIG. 5 illustrates an exemplary embodiment of a software-in-the-loop simulation, i.e. a simulation for which production code is generated and compiled, the resulting executable then being run on the host computer. In a software-in-the-loop simulation, the effect of converting high-precision operations to lower-precision operations on the accuracy of the control can be observed. When high-precision operations, in particular operations on a double precision data type, are converted to lower-precision operations, in particular fixed-point operations, quantization errors, overflows or saturation effects may occur.

As indicated by the outermost rectangle, each step of a software-in-the-loop simulation is carried out by a processor of the host computer PC. The host computer may e.g. be realized as a personal computer running a standard operating system such as Windows or Linux. When the host computer is equipped with a multicore processor, i.e. a microprocessor comprising multiple processor cores on a single chip, different software components may be run on different processor cores; also each component may make use of several processor cores for speed up of its execution.

The technical computing environment TCE comprises a simulation engine for executing block diagrams; the simulation engine may in particular comprise a solver. At least one block or subsystem SYS corresponding to a model of the plant, i.e. the dynamical system to be controlled, is executed in the simulation engine. The plant model block SYS may comprise an arbitrary number of subordinate blocks. At least one signal, e.g. a sensor output, is sent from the plant model block to a communication function S-Fct., which is integrated with the simulation engine of the technical environment. In the picture, signals are represented by arrows from a sending block to a receiving block. The communication function may advantageously replace in the simulation engine the one or more blocks for which a software-in-the-loop simulation mode has been selected and provide a mechanism for exchanging signals. The communication function may be generated by the technical computing environment, in particular based on the specification of the one or more blocks with respect to input or output ports and/or signals received or sent by these blocks.

The communication Function S-Fct. provides for an exchange of signals, which may be represented by the value of a variable, with an executable OBJ that was created from the one or more selected blocks via the production code generator PCG and the production code compiler PCO. The executable OBJ containing the compiled production code may e.g. be realized as a dynamic link library in the operating system of the host computer. Input/Output signals of the executable OBJ are sent/received by the communication function and transferred from/to the simulation environment. Also other data interesting for analysis during this testing process maybe collected and transferred from/to the executable OBJ, for example coverage data. In the shown example, the block diagram comprises an actuator model block ACT, which modifies the output signals of the executable OBJ and sends the resulting signal to the plant model SYS. As a result, a closed-loop simulation of the complete dynamical system comprising plant and controller can be performed.

The executable OBJ is external to the computing environment, and thus may be analyzed by an arbitrary debugger using mechanisms of the operating system of the host computer PC unobstructed by components of the TCE in between. In the shown example, a debugger DEB indicated as a rectangle analyzes the executable OBJ, as indicated by a dashed arrow. Thus, a software-in-the-loop simulation allows for a fast and efficient testing of the control program implemented in the production code.

Figure 6:
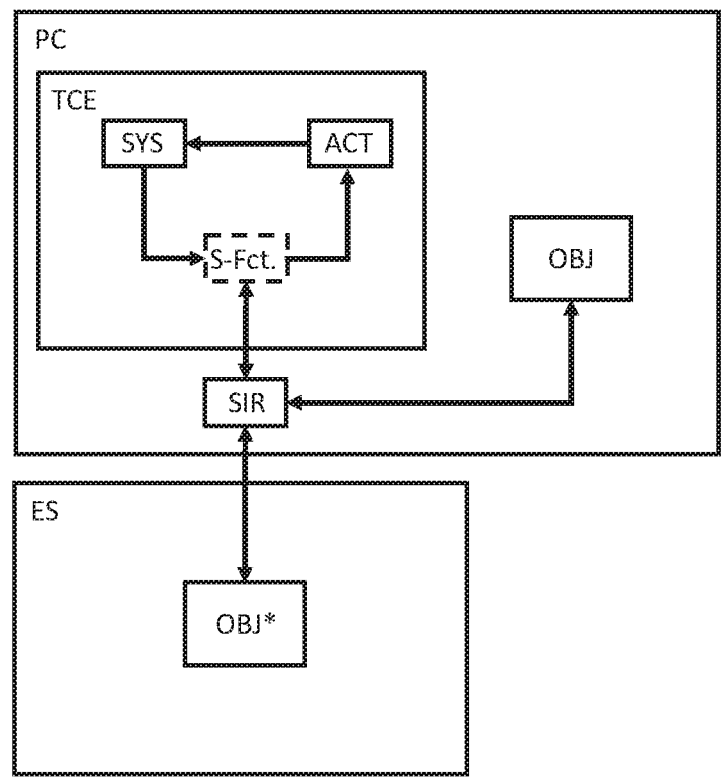
FIG. 6 is an exemplary diagram of a test environment allowing for switching between a software-in-the-loop simulation mode and a processor-in-the-loop simulation mode.

FIG. 6 displays an exemplary embodiment of a test environment that allows for switching between a software-in-the-loop simulation mode and a processor-in-the-loop simulation mode. An upper rectangle indicating the host computer PC and a lower rectangle indicating an embedded system ES are shown in the figure. The host computer PC and the embedded system ES are connected via a dedicated interface; the dedicated interface may restrict the data transfer speed, so that only a limited number of signals or corresponding variables may be exchanged without excessive slowing of the simulation and thus the debugging capabilities may be considerably limited.

As in the previous figure, the technical computing environment TCE comprises a simulation engine which executes a plant model SYS and may execute an actuator model ACT. In the shown test environment, a communication function S-Fct. is adapted to provide for an exchange of signals between the simulation engine in the TCE and the signal router SIR.

The signal router SIR allows for exchanging signals between the simulation engine and/or one or more executables; it is external to the technical computing environment, so that it uses neither the modeling environment MOD, nor the simulation engine SIM, nor the script interpreter MAT, but is only connected to the communication function S-Fct. for a transfer of signals. The signal router may be realized as a standalone executable or as a library routine, in particular a DLL, in the operating system of the host computer.

The test environment comprises a host environment for executing the control program OBJ on the host computer and a target environment for executing the control program OBJ* on the embedded system. Preferably, the signal router allows for static or on-the-fly switching between a software-in-the-loop simulation and a processor-in-the-loop simulation by redirecting the exchanged signals. Further, it is possible to simulate several subsystems or submodels in a software-in-the-loop or a processor-in-the-loop simulation mode at once by the router routing the corresponding signals for each.

When a processor-in-the-loop simulation is performed, the production code is cross-compiled on the host computer to create an executable OBJ* that is subsequently being run on another processor, in particular a microcontroller of an embedded system. In a processor-in-the-loop simulation, both the correctness of the code generator, preferably configured according to a specific set of options, and the correctness of the compiler for the target platform, preferably also configured according to a specific set of options, can be verified.

When a software-in-the-loop simulation is performed, the effect of converting high-precision operations to lower-precision operations on the accuracy of the control can be observed in order to check the correctness of the code generator. Using the mechanisms of the operating system of the host computer, a plurality of dedicated programs such as a stand-alone debugger may be interfaced to the executable OBJ for a fast and extensive analysis of the control program implemented in the production code.

Figure 7:
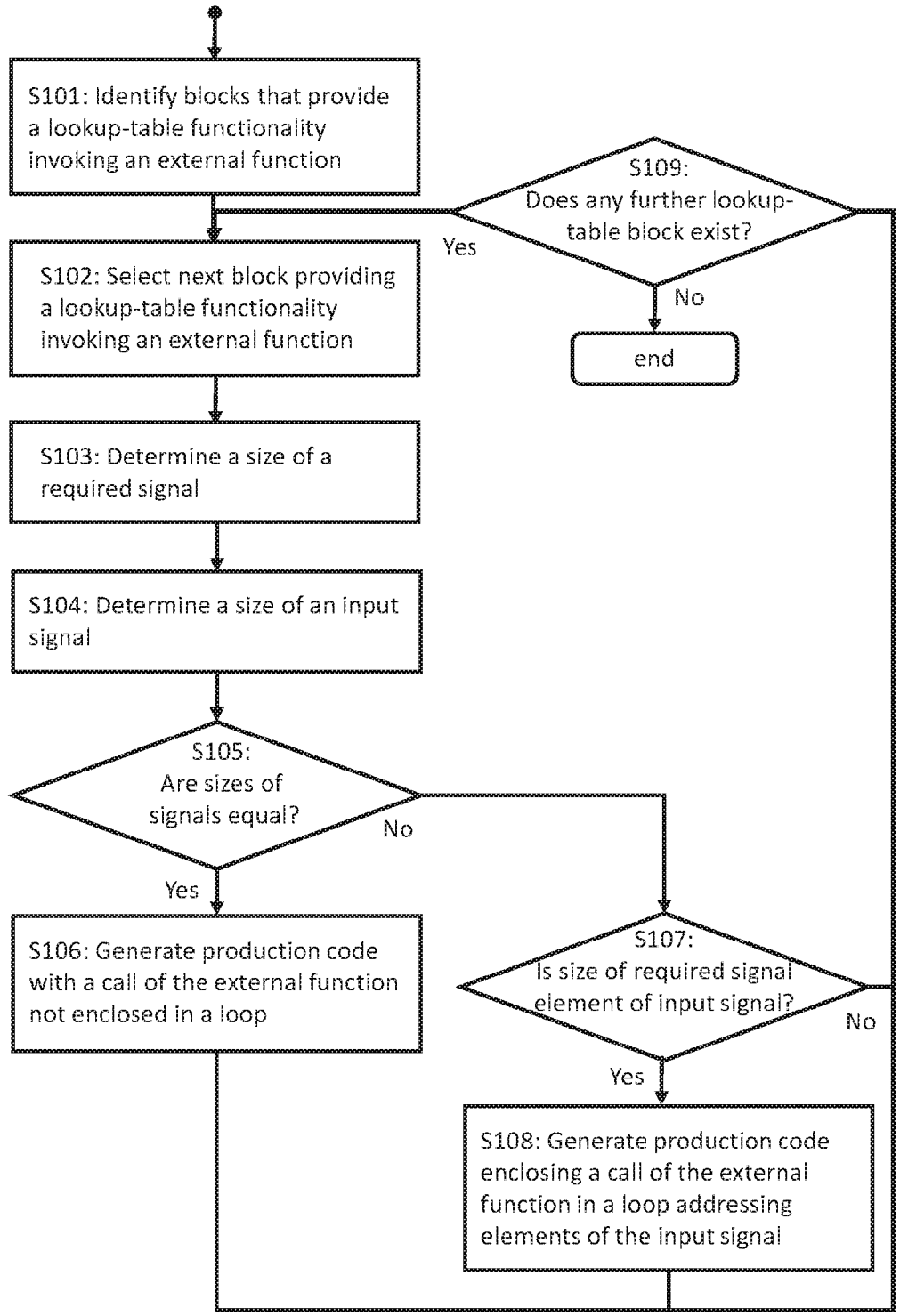
FIG. 7 is a diagram of an exemplary embodiment of the inventive method.

FIG. 7 displays a schematic diagram of a preferred embodiment of the inventive method for generating production code from a block diagram in a technical computing environment, the method preferably being carried out by a processor of the host computer. This embodiment of a computer-implemented method for automatically generating production code comprises:

Identifying, in step S101, blocks in the block diagram that provide a lookup-table functionality invoking an external function in the production code. The identified blocks are preferably stored in a list.

Selecting, in step S102, the next block that provide a lookup-table functionality invoking an external function in the production code. Preferably, the first identified block is extracted from the list and analyzed in the following steps, provided the list is not empty.

Determining, in step S103, a size of a required signal of the selected block. This step may comprise retrieving a template of the external function, particularly in order to determine the data type of required arguments of the external function. When the required signal is of a scalar data type, the size may e.g. be one.

Determining, in step S104, a size of an input signal of the selected block. This step may comprise invoking a modeling environment of the TCE via an application-programming interface.

Comparing, in step S105, the size of the required signal to the size of the input signal. In the shown embodiment, it is checked if the size are equal. Generally, an external function may be adapted to accept signals in predefined size ranges, e.g. a vector of a size between 2 and 1000 elements. In that case, the size of the required signal and the size of the input signal may be determined to be equal as long as the size of the input signal is in the predefined size range.

Generating, in step S106, a production code with a call of the external function that is not enclosed in a loop. Because further blocks may exist which provide a lookup-table functionality invoking an external function, after generating a combined production code for the current group of adjacent blocks, the method is continued in step S109.

When the size of the required signal and the size of the input signal are not equal, in step S107, the size of the required signal is compared to the size of an element in the input signal of the selected block. If the sizes are not equal, the method is continued in step S109. If the sizes are equal, the method is continued in step S108.

Generating, in step S108, a production code enclosing a call of the external function in a loop addressing each of the plurality of elements in the input signal. Because further blocks may exist which provide a lookup-table functionality invoking an external function, after generating a combined production code for the current group of adjacent blocks, the method is continued in step S109.

Checking, in step S109, if any further block exists which provides a lookup-table functionality by invoking an external function in the production code. In case any further block exists, the method continues at step S102; the next block is selected and analyzed. When no further block exists, the method ends.

Those skilled in the art will appreciate that the order of at least some of the steps may be changed without departing from the scope of the claimed invention. For instance, a comparison of the signals dimensions may be carried out in one step or in two steps of reversed order relative to the shown embodiment.

Figure 8:
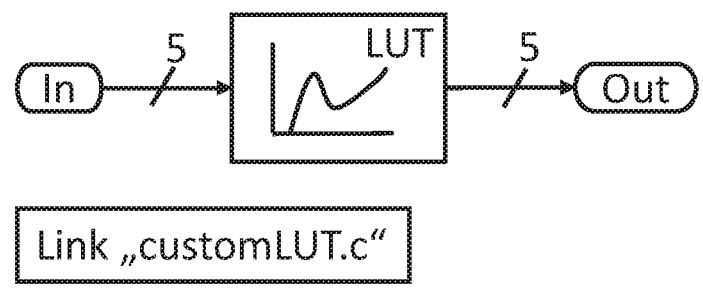
FIG. 8 is an exemplary block diagram to which the inventive method may be applied.

FIG. 8 displays an exemplary block diagram to which the inventive method may be applied. The shown diagram preferably implements the functionality of a block in a higher hierarchical level. In the diagram, an input port In is connected to a block LUT providing a lookup-table functionality. The resulting output signal is fed to an output port Out. In a dedicated block, the external function "custom LUT.c" (or the file specifying the function) implementing the lookup-table functionality is specified. As indicated on the arrows representing the signal, both the input signal and the output signal of the block LUT are composite signals comprising 5 elements.

FIG. 9a displays an example of production code when the dimension of the required signal for the external function corresponds to that of an element in the input signal. When the function specified in "customLUT.c" requires a scalar input signal, the production code generator encloses the call of the external function by a loop consecutively addressing each element of the input signal.

FIG. 9b displays an example of combined production code when the dimension of the required signal for the external function corresponds to that of the input signal. When the function specified in "customLUT.c" requires a vector as input signal, the production code generator generates a call of the external function without enclosing loop. Preferably, the required arguments for a call of the external function are given in a template or a header file of the function. In the shown example, the production code generator added an indication of the size, i.e. the number of elements of the input signal.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A computer-implemented method for generating production code from a block diagram in a technical computing environment on a host computer, wherein a block in the block diagram comprises a number of input ports for receiving signals and a number of output ports for sending signals, wherein a first block in the block diagram provides a functionality that is being implemented in the production code by invoking an external function, wherein the first block receives a first input signal that comprises a plurality of elements, the method being carried out by a processor of the host computer, the method comprising:
   determining a size of a first required signal of the external function;
   comparing a size of the first input signal to a size of the first required signal; and
   generating a production code enclosing a call of the external function by a loop consecutively addressing each of the plurality of elements in the first input signal when the size of the first required signal corresponds to a size of an element in the first input signal, or
   generating a production code comprising a call of the external function without enclosing loop over the elements in the first input signal when the size of the first required signal corresponds to the size of the first input signal.

2. The method of claim 1, wherein the first block receives a second input signal that comprises a plurality of elements, the method further comprising:
   determining a size of a second required signal of the external function;
   comparing a size of the second input signal to the size of the first required signal; and
   generating a production code enclosing a call of the external function by a loop consecutively addressing each of the plurality of elements in the second input signal when the size of the second required signal corresponds to the size of the element in the first input signal, or
   generating a production code comprising a call of the external function without enclosing loop over the elements in the second input signal when the size of the second required signal corresponds to the size of the second input signal.

3. The method of claim 1, wherein the host computer comprises more than one processor core in one or more processors, and wherein generating the production code comprises generating instructions for distributing the execution of a loop addressing the plurality of elements over the available processor cores.

4. The method of claim 1, wherein the step of determining a size of the required input signal of the external function comprises retrieving a template of the external function from a script in a language adapted to the technical computing environment or from a header file.

5. The method of claim 1, wherein the step of determining a size of the required input signal comprises determining an elementary data type of the required input signal, wherein the elementary data type is compared to a data type of an element in the first input signal, and wherein an error is signaled when the elementary data type of the required input signal is not compatible to the data type of the elements in the first input signal.

6. The method of claim 5, wherein the step of comparing the size of the first input signal to the size of the required input signal comprises verifying that the elementary data type of the required input signal is equal to the data type of the elements in the first input signal.

7. The method of claim 5, wherein, when the size of the first input signal is one and the size of the required input signal is bigger than one, the code generator adds instructions for assigning the current value of the first input signal to each of the elements of the required input signal.

8. The method of claim 1, wherein a plurality of external functions providing the functionality are registered in the technical computing environment, each external function being registered with a template defining a size and an elementary data type of the required input signal and defining a size and an elementary data type of a resulting output signal, and wherein the external function to be invoked is determined based on a comparison of the size of the required input signal for the respective external function and the size of the first input signal and/or a comparison of the elementary data type of the required input signal for the respective external function and the data type of the elements in the first input signal and/or based on a default setting in a user interface.

9. The method of claim 1, wherein the first input signal is a vector type, wherein the size of the first input signal is an integer bigger than one or of a matrix type, wherein the size of the first input signal is an integer bigger than one times an integer bigger than one, or wherein the elements of the first input signals are of a scalar type.

10. The method of claim 1, wherein the dimension of the first input signal is higher than the dimension of a vector, so that the first input signal is composed of a plurality of independent vectors or a matrix type, and wherein the elements of the first input signal are of a vector type.

11. The method of claim 10, wherein the required input signal is of a scalar type, and wherein generating a production code comprises placing the call of the external function in an inner loop consecutively addressing each of the plurality of elements in the elements of the first input signal.

12. The method of claim 1, wherein the functionality is a lookup table functionality that comprises storing an index value of a previous invocation of the lookup table functionality in a state variable.

13. The method of claim 12 wherein the state variable comprises a number of elementary variables, and wherein the number of elementary variables comprised in the state variable depends on the size of the first input signal.

14. The method of claim 12, wherein the state variable comprises a single elementary variable, and wherein the lookup table functionality uses the single elementary variable as state variable for all elements of the first input signal.

15. The method of claim 12, wherein the technical computing environment comprises a user interface for switching between a state variable comprising a number of elementary variables and a state variable comprising a single elementary variable.

16. A non-transitory computer readable medium containing instructions that, when executed by a processor of a computer system, cause the computer system to carry out a method according to claim 1.

17. A computer system comprising:
a processor;
a random access memory;
a graphics controller connected to a display;
a serial interface connected to at least one human input device; and
a nonvolatile memory or a hard disk or solid state disk, the nonvolatile memory comprising instructions that, when executed by the processor, cause the computer system to carry out a method according to claim 1.

* * * * *